May 23, 1933.  H. CHARRIER  1,910,281
APPARATUS FOR DISTILLING WATER
Filed Dec. 2, 1930

H. Charrier
Inventor
By: Marko & Clerk
Attys.

Patented May 23, 1933

1,910,281

UNITED STATES PATENT OFFICE

HENRI CHARRIER, OF LILLE, FRANCE, ASSIGNOR TO SOCIETE ANONYME APPAREILS ET EVAPORATEURS KESTNER, OF LILLE, FRANCE, A CORPORATION OF FRANCE

APPARATUS FOR DISTILLING WATER

Application filed December 2, 1930, Serial No. 499,593, and in Germany August 2, 1930.

This invention concerns an improvement in or modification of the purifying apparatus cooperating with apparatus for distilling water and of the type in which the crude or natural feed water is chemically purified with a view to obviating incrustation of the heating surfaces, before passing to the tubular heater of evaporating apparatus of the type comprising a tubular heater and a steam separating chamber between which the water undergoing evaporation circulates. The method of obviating incrustation of the heating surfaces by means of an apparatus of such a type demands appropriate control of the rate of circulation, of introduction of the crude feed water and one or more suitable chemical reagents, such, for instance, as sodium carbonate, caustic soda, lime, aluminum sulphate or iron sulphate and an appropriate capacity of the decanting portion of the apparatus, in order that sufficient time should elapse for the desired chemical reaction to be completed in the latter, i. e. before the added water passes to the tubular heater.

Such purifying apparatus are already known, in which the crude water and reagent, added to replace water distilled off as steam, become mixed, before decantation, with the liquid circulating in the apparatus. Consequently the chemical reaction has to take place in a large volume of water, and to ensure satisfactory results the combined feed-reservoir and decanting portion of the separating chamber have to be of large capacity to accommodate an appropriate amount of water.

The present invention broadly stated consists in an improvement in or modification of the said purifying apparatus, whereby only the crude water mixed with a reagent and replacing the water removed as steam, shall traverse the decanting portion of the apparatus, thus causing the reaction to take place in the relatively small quantity of water added, in a space of smaller capacity, and making the rate of the main circulation through the apparatus independent of that through the reacting and decanting portion. The dimensions of the separating chamber can therefore be reduced substantially.

This improved or modified method may be carried into effect by means of apparatus comprising a decanting and reaction cylinder or like isolating means so mounted within the separating chamber that its upper edge is disposed above the water level therein, whilst its lower edge is substantially below the level of the outlet from the chamber to the heater as heretofore.

Preferably the inlet and outlet conduits connecting the separating chamber to the heater are so disposed as to induce a flow of the heated water, coming from and returning to the heater, around the decanting cylinder, and the latter may conveniently terminate at its lower end in a truncated cone. For example at least one of the conduits may be directed substantially tangentially to the cylinder.

In order that the invention may be fully understood and readily carried into effect the same will now be more particularly described with reference to the accompanying drawing which illustrates diagrammatically, and by way of example only, a constructional form.

The heater 1 of any suitable kind having for example steam heated tubular heating surfaces, communicates with the separating chamber 2, in which is separated the steam and also undesired ingredients from the feed water, through the inlet pipe or conduit 3 and the outlet pipes or conduits 4, 12.

Figure 1:
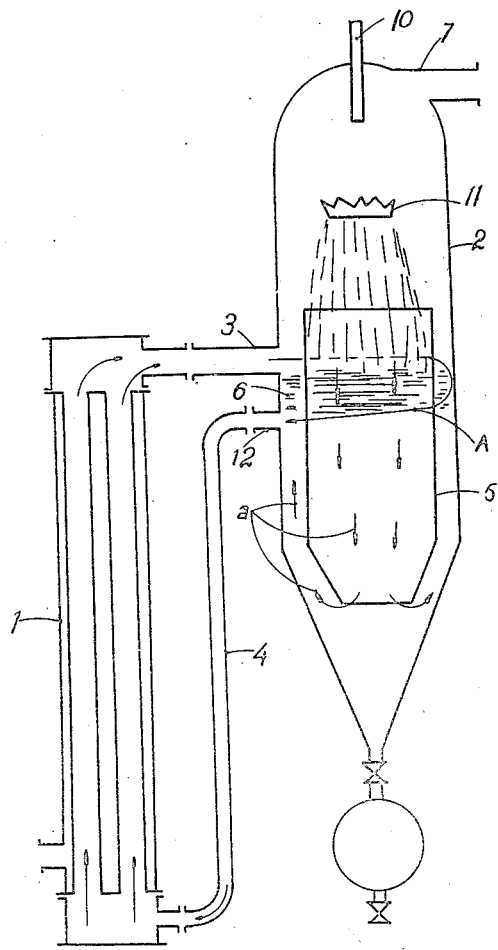
Fig. 1 is an elevational sectional view of the apparatus.
Figure 2:
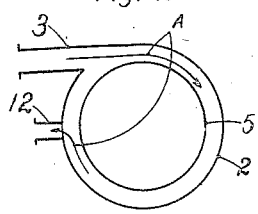
Fig. 2 is an explanatory horizontal section.

Inside the separating chamber 2 is arranged a decanting cylinder 5 which may terminate at its lower end in a truncated conical part. According to this invention the upper edge of the cylinder 5 is so disposed that it is above the level of water 6, the water level being determined by the lower surface of the conduit 3. Thus the water coming from the heater through the conduit 3 is prevented from entering the cylinder 5, and circulates around it. Preferably one or both of the conduits 3 and 12 are directed substantially tangentially to the cylinder 5 to cause the water to flow around the cylinder as indicated in Fig. 2.

The crude or feed water enters the separating chamber through the pipe 10 after having been mixed with one or more suitable chemical reagents, and flows on to a diffuser 11 before falling into the interior of the cylinder 5. In this manner it becomes heated due to the high temperature existing in the separating chamber.

When the apparatus is working, that is to say when the tubular heater 1 is heated by steam and the separating chamber 2 is filled with water to the level indicated, two distinct circulations are set up in the apparatus. One, which may be termed the main circulation, is that of the water in process of evaporation circulating through the heater and that part of the separating chamber outside the decanting cylinder 5 around which it circulates in the direction indicated by the arrow A. The second circulation is that of the crude water containing a reagent, which enters at 10 and passes down over the diffusing device 11 and through the inside of the decanting cylinder 5 and then after having deposited undesired ingredients flows up around the cylinder 5 and joins the main circulation to replace the amount of water distilled off as steam; the direction of this circulation is indicated by the arrows a. It will thus be seen that the rates of circulation through what may be termed the main and decanting portions of the apparatus can be quite independent with obvious advantages. The steam passes out of the separating chamber through the pipe 7 which may be connected to a condenser or the like.

It will be appreciated that the quantity of water passed through the decanting cylinder 5 in any given time is very small compared with the quantity circulated in the main circulation, as only sufficient fresh water is added to replace that evaporated on each circuit.

I claim:

1. An apparatus for distilling water comprising a water heater, a steam separating chamber, inlet and outlet means connected with the top and bottom, respectively, of the heater and connecting the latter with said chamber, a decanting cylinder located in the chamber and disposed with its upper edge located above and its lower edge below said inlet and outlet means, and means for supplying feed water to the upper end of said cylinder.

2. An apparatus for distilling water including a water heater, a separating chamber, an inlet and outlet for said chamber connected with the top and bottom, respectively, the heater, a decanting cylinder located in the chamber with its upper edge above and its lower edge below said inlet and outlet, a substantially circular passage in said chamber around said cylinder, and means for supplying feed water to the upper end of said cylinder.

3. An apparatus for distilling water including a water heater, a separating chamber, an inlet and outlet for said chamber connected with the top and bottom, respectively, of the heater, a decanting cylinder located in the chamber with its upper edge above and its lower edge below said inlet and outlet, a substantially circular passage in said chamber around said cylinder, said inlet and outlet for the water being constituted by conduits and at least one of said conduits being arranged substantially tangential to said passage, and means for introducing feed water into the upper end of said cylinder.

In testimony whereof he has signed this specification.

HENRI CHARRIER.